United States Patent
Matsumura et al.

(10) Patent No.: US 11,572,457 B2
(45) Date of Patent: Feb. 7, 2023

(54) CELLULOSE ACETATE AND CELLULOSE ACETATE COMPOSITION

(71) Applicant: Daicel Corporation, Osaka (JP)

(72) Inventors: Hiroyuki Matsumura, Tokyo (JP); Hiroki Taniguchi, Tokyo (JP); Akihiro Higuchi, Tokyo (JP); Tomohiro Hashizume, Tokyo (JP); Masaaki Kusumoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/715,989

(22) Filed: Apr. 8, 2022

(65) Prior Publication Data

US 2022/0227973 A1    Jul. 21, 2022

Related U.S. Application Data

(63) Continuation of application No. PCT/JP2020/039573, filed on Oct. 21, 2020.

(51) Int. Cl.
   *C08L 1/12*   (2006.01)
   *C08K 3/22*   (2006.01)
   *C08K 5/10*   (2006.01)

(52) U.S. Cl.
   CPC .......... *C08L 1/12* (2013.01); *C08K 3/22* (2013.01); *C08K 5/10* (2013.01); *C08K 2003/2217* (2013.01); *C08L 2201/06* (2013.01)

(58) Field of Classification Search
   None
   See application file for complete search history.

(56) References Cited

U.S. PATENT DOCUMENTS

| | | | | |
|---|---|---|---|---|
| 2017/0342598 A1* | 11/2017 | Hölter | ............... | C08J 3/212 |
| 2018/0346713 A1* | 12/2018 | Soyama | ............... | C08K 5/544 |
| 2019/0276664 A1* | 9/2019 | LaPray | ............... | C08L 67/02 |
| 2020/0017647 A1* | 1/2020 | Elkins | ............... | C08B 3/08 |
| 2021/0380782 A1 | 12/2021 | Ga et al. | | |

FOREIGN PATENT DOCUMENTS

| | | |
|---|---|---|
| CN | 102585297 A | 7/2012 |
| JP | 2002-30182 A | 1/2002 |
| JP | 2002-265501 A | 9/2002 |
| JP | 2015-224256 A | 12/2015 |
| JP | 2018-500416 A | 1/2018 |
| JP | 2018-24803 A | 2/2018 |
| JP | 2020-515682 A | 5/2020 |
| WO | 2016/092024 A1 | 6/2016 |
| WO | 2018/183467 A1 | 10/2018 |
| WO | 2019/198307 A1 | 10/2019 |
| WO | 2020/035964 A1 | 2/2020 |

OTHER PUBLICATIONS

Machine translation of CN 102585297 (Year: 2012).*
Xu et al., "Regioselective Synthesis of Cellulose Ester Homopolymers", BioMACROMOLECULES, vol. 13, 2012, pp. 2195-2201.
Haske-Cornelius et al., "Enzymatic Systems for Cellulose Acetate Degradation", Catalysts, vol. 7, No. 10, 2017, pp. 1-15.
Quintana et al., "Compatibilization of co-plasticized cellulose acetate/ water soluble polymers blends by reactive extrusion, Polymer Degradation and Stability", vol. 126, 2016, pp. 31-38.
Kamitakahara, "Regiocontrolled Synthesis of Cellulose Derivatives and Their Functions", vol. 60, No. 3, pp. 144-168 (25 pages Including English Abstract).
Kamide et al., "Dilute Solution Properties of Water-Soluble Incompletely Substituted Cellulose Acetate", Polymer Journal, vol. 13, No. 5, 1981, pp. 421-431.
Hettiarachchi et al., "Characterization of an acetyl xylan esterase from the marine bacterium Ochrovirga pacifica and its synergism with xylanase on beechwood xylan", Microbial Cell Factories, vol. 18, Issue 122, 2019, pp. 1-10.
Tezuka et al., "Determination of substituent distribution in cellulose acetate by means of a 13C NMR study on its propanoated derivative", Carbohydrate Research, vol. 273, 1995, pp. 83-91.
International Search Report dated Dec. 22, 2020, received for PCT Application PCT/JP2020/039573, Filed on Oct. 10, 2020, 4 pages.
European search report dated Sep. 26, 2022, in corresponding European patent Application No. 20955471.6, 4 pages.

* cited by examiner

Primary Examiner — Robert T Butcher
(74) Attorney, Agent, or Firm — Xsensus LLP

(57) ABSTRACT

This cellulose acetate has a total degree of acetyl substitution of 1.75 or more and 2.55 or less, and a degree of acetyl substitution at 2-position or a degree of acetyl substitution at 3-position is 0.7 or less. This cellulose acetate composition includes the cellulose acetate and an additive. The additive is one or more selected from the group consisting of (a) substances of which a pH of a 1 wt. % aqueous solution at 20° C. is 8 or more, (b) substances that dissolve in water at 20° C. in an amount of 2 wt. % or more, and (c) substances that exhibit biodegradability in seawater.

20 Claims, No Drawings

CELLULOSE ACETATE AND CELLULOSE ACETATE COMPOSITION

CROSS-REFERENCE TO RELATED APPLICATION

This application is a continuation of PCT International Application No. PCT/JP2020/039573 filed on Oct. 21, 2020, the entire contents of which are incorporated herein by reference.

TECHNICAL FIELD

The present disclosure relates to cellulose acetate and a composition containing cellulose acetate.

BACKGROUND ART in recent years, there has been a demand for biodegradable molded articles due to growing interest in global environment. Examples of representative biodegradable resins include cellulose acetate.

For example, cellulose acetate having a degree of substitution of about 2.5 is used as a material for a cigarette filter used in cigarettes including e-cigarettes, as a material for a sanitary article, or the like. Cellulose acetate having a degree of substitution of about 2.5 is known to decompose in soil or activated sludge. However, the biodegradability thereof falls short of cellulose or cellulose acetate having a degree of substitution of 1.8.

From the viewpoint of improving the biodegradability, the degree of substitution of cellulose acetate is preferably low, but a certain degree of substitution of acetyl is required because of the ease of processing by thermoforming or the like. Various studies have been made for the purpose of improving the biodegradability and moldability.

Patent Document 1 discloses a technique for improving the biodegradability of a polymer such as cellulose ester by adding a basic additive having a pH of 13 or less and 7 or more in a 1% aqueous solution (20° C.) in the polymer.

Patent Document 2 discloses a technique for reducing the viscosity of a cellulose acylate solution used in the solvent casting method by setting −0.1≤(degree of acyl substitution at 3-position—degree of acyl substitution at 2-position)≤0.3 in cellulose acylate having a total degree of acyl substitution of 2.67 or more at 2-, 3-, and 6-positions, and a total degree of acyl substitution of 1.97 or more at 2- and 3-positions.

CITATION LIST

Patent Document

Patent Document 1: JP 2018-500416 T
Patent Document 2: JP 2002-265501 A

SUMMARY OF INVENTION

Technical Problem

As mentioned above, cellulose acetate is known to be decomposed in soil or activated sludge. However, there is a problem that a satisfactory decomposition rate cannot be obtained in a water system having a smaller number of bacteria than activated sludge, for example, in sea water.

An object of the present disclosure is to provide cellulose acetate and a composition that have excellent marine biodegradability.

Solution to Problem

As a result of intensive studies, the present inventors have found that biodegradability in the sea is remarkably improved even in cellulose acetate having a relatively high total degree of acetyl substitution by heterogeneously introducing acetyl groups into carbon atoms at 2-, 3-, and 6-positions of a glucose ring, and have completed the present disclosure.

That is, the cellulose acetate according to the present disclosure has a total degree of acetyl substitution of 1.75 or more and 2.55 or less, and at least one of the degree of acetyl substitution at 2-position or the degree of acetyl substitution at 3-position is 0.7 or less.

Preferably, in the cellulose acetate, the degree of acetyl substitution at 2-position and the degree of acetyl substitution at 3-position each are 0.7 or less.

Preferably, the cellulose acetate has a total degree of acetyl substitution of 2.00 or more. Preferably, the cellulose acetate has a total degree of acetyl substitution of 2.20 or less.

The cellulose acetate according to the present disclosure contains any of the cellulose acetate described above and an additive. This additive is selected from the group consisting of (a) substances of which a pH of a 1 wt. % aqueous solution at 20° C. is 8 or more, (b) substances that dissolve in water at 20° C. in an amount of 2 wt. % or more, and (c) substances that exhibit biodegradability in seawater.

Preferably, a content of cellulose acetate in the entire composition is 50 wt. % or more. Preferably, a total content of additives in the entire composition is 3 wt. % or more and 40 wt. % or less.

Preferably, the substance (a) of which a pH of a 1 wt. % aqueous solution at 20° C. is 8 or more is selected from the group consisting of (a1) to (a3) below:

(a1) inorganic compounds containing an oxygen atom bonded to any metal element of Na, K, Ca, or Mg, (a2) metal salts containing one or more metal ions selected from $Na^+$, $K^+$, $Ca^{2+}$, or $Mg^{2+}$, and one or more anions selected from a carbonate ion, a bicarbonate ion, a silicate ion, or an aluminate ion, and (a3) inorganic compounds containing magnesium.

Preferably, the main component of the inorganic compound (a3) containing magnesium is magnesium oxide.

Preferably, the substance (b) that dissolves in water at 20° C. in an amount of 2 wt. % or more is selected from the group consisting of (b1) to (b3) below:

(b1) glycerin esters,
(b2) citrates, and
(b3) polyethylene glycols having a number average degree of polymerization of 20 or less.

Preferably, the substance (c) that exhibits biodegradability in seawater is a polyester having a weight average molecular weight of 50,000 or less.

Preferably, the cellulose acetate composition contains an additive including a combination of magnesium oxide and triacetin.

Advantageous Effects of Invention

The cellulose acetate and the cellulose acetate composition according to the present disclosure are excellent in biodegradability, particularly biodegradability in seawater.

DESCRIPTION OF EMBODIMENTS

The present disclosure is described in detail below based on preferable embodiments. The scope of the present disclosure is not limited to these descriptions, and can be appropriately changed and implemented within a range not impairing the gist of the present disclosure, in addition to the following examples. In addition, the present disclosure is not limited to the following embodiments, and various modifications can be made within the scope described in claims. Other embodiments obtained by appropriately combining the technical means disclosed for each of the plurality of embodiments are also included in the technical scope of the present disclosure.

In the present specification, "X to Y" indicating a range means "X or more and Y or less". Also, unless otherwise noted, "ppm" means "ppm by weight".

[Cellulose Acetate]

The cellulose acetate of the present disclosure has a total degree of acetyl substitution (DS) of 1.75 or more and 2.55 or less, and at least one of the degree of acetyl substitution at 2-position (DS2) or the degree of acetyl substitution at 3-position (DS3) is 0.7 or less. This cellulose acetate is excellent in biodegradability, particularly biodegradability in seawater.

The mechanism of biodegradation of cellulose acetate will be described below. The biodegradation of cellulose acetate is believed to progress under an action of an enzyme (for example, β-glucosidase; EC 3.2.1.21) that decomposes cellulose after each acetyl group of cellulose acetate is hydrolyzed to reduce the degree of substitution. β-glucosidase is an enzyme that catalyzes the hydrolysis reaction of β-glycoside bonds of sugars. β-glucosidase is also called β-D-glucoside glucohydrolase and amygdalase. When the β-glycoside bond constituting a polymer chain of cellulose acetate is hydrolyzed, a monosaccharide or a low molecular weight polysaccharide is obtained. The monosaccharide or the low molecular weight polysaccharide is decomposed by normal microbial metabolism. Therefore, in order to promote biodegradation of cellulose acetate, it is effective to promote elimination of an acetyl group.

In the related art, cellulose acetate having a low degree of substitution of acetyl groups is considered to have excellent biodegradability from this consideration. This consideration is not wrong. However, when the degree of substitution is low, the melt viscosity increases, and thermal decomposition easily occurs. As a result, the thermoforming of cellulose acetate having a low degree of substitution is difficult.

Meanwhile, hemicellulose constituting wood contains an acetyl group in part. It is known that this acetyl group is bonded to xylan to form acetylxylan in hardwoods. This acetylxylan is also biodegradable. It is known that acetylxylan esterase (EC 3.1.1.72) exists in order to decompose acetylxylan and the like. The acetylxylan esterase is an enzyme that catalyzes deacetylation of xylan and xylooligosaccharide. This enzyme is classified as a hydrolase, and particularly acts on an ester bond.

It is known that only a few percent of bacteria are present in the sea as compared to land. Acetylxylan esterase is also an enzyme possessed by marine bacteria. For example, the marine bacteria Ochrovirga pacifica produces acetylxylan esterase. This acetylxylan esterase is known to maintain its activity for 120 minutes at a temperature of 45° C. (Microbial cell factories, 2019 Jul. 8 Vol. 18 issue (122)).

The present inventors have studied the use of this acetylxylan esterase for biodegradation of cellulose acetate. In the study, it has been found that acetylxylan esterase is an enzyme for ester hydrolysis, and in particular, cellulose acetate having a low substituent at 2- and 3-positions is easily decomposed by acetylxylan esterase. Furthermore, it has been found that when cellulose acetate has the same total degree of substitution, a lower degree of substitution of the substituents at 2- and 3-positions is advantageous for biodegradability, particularly biodegradability in the sea, and thereby the present disclosure has been conceived.

From another viewpoint, it is known that the sea is weakly basic, and that this basicity leads to deacetylation of cellulose acetate. As a result of studies, the present inventors have found that deacetylation (hydrolysis) under basic conditions is promoted in cellulose acetate in which acetyl groups are heterogeneously introduced into carbon atoms at 2-, 3-, and 6-positions of a glucose ring. In addition, it has been found that β-glucosidase is more likely to act when the glucose rings in which substituents at 2- and 3-positions have been hydrolyzed are consecutive, and thereby the present disclosure has been conceived.

In the cellulose acetate of the present disclosure, at least one of the degree of acetyl substitution at the 2-position or the degree of acetyl substitution at the 3-position is 0.7 or less in the total degree of acetyl substitution of 1.75 or more and 2.55 or less. In this cellulose acetate, the degrees of substitution at 2-, 3-, and 6-positions are not uniform. With the cellulose acetate of the present disclosure having a low degree of substitution of at least one of 2-position or 3-position, deacetylation under the basic conditions is promoted. It is considered that due to this promoting effect, the total degree of substitution of cellulose acetate is reduced, and a high biodegradation rate in seawater is achieved.

The degrees of acetyl substitution at 2-position and 3-position are not particularly limited as long as one of them is 0.7 or less. For example, when the degree of acetyl substitution at 2-position is 0.7 or less, the degree of acetyl substitution at 3-position may be 1.0 or less, 0.9 or less, or 0.8 or less. Similarly, when the degree of acetyl substitution at 3-position is 0.7 or less, the degree of acetyl substitution at 2-position may be 1.0 or less, 0.9 or less, or 0.8 or less. From the viewpoint of ease of production, the degree of acetyl substitution at 2-position or 3-position is preferably 0.1 or less.

Since the biodegradability in seawater is improved, at least one of the degree of acetyl substitution at 2-position or the degree of acetyl substitution at 3-position is preferably 0.6 or less, and more preferably 0.5 or less. Both the degree of acetyl substitution at 2-position and the degree of acetyl substitution at 3-position are preferably 0.7 or less, more preferably 0.6 or less, and particularly preferably 0.5 or less.

The degree of acetyl substitution at 6-position is not particularly limited and is adjusted to satisfy the range of total degree of acetyl substitution described below.

Each of the degrees of acetyl substitution at 2-, 3-, and 6-positions of the glucose ring of the cellulose acetate can be measured by NMR in accordance with the method of Tezuka (Tezuka, Carbonydr. Res. 273, 83 (1995)). That is, the free hydroxyl group of a cellulose acetate sample is propionylated with propionic anhydride in pyridine. The resulting sample is dissolved in deuteriochloroform, and the $^{13}$C-NMR spectrum is measured. The carbon signals of the acetyl group appear in the region from 169 ppm to 171 ppm in the order of 2-, 3-, and 6-positions from the high magnetic field; and the carbonyl carbon signals of the propionyl group appear in the region from 172 ppm to 174 ppm in the same order. Each of the degrees of acetyl substitution at 2-, 3-, and 6-positions of the glucose ring in the original cellulose acetate can be determined from the abundance ratio of the acetyl group and the propionyl group at respective positions (in other words, the area ratio of the signals). The degree of acetyl substitution can be analyzed by $^1$H-NMR in addition to $^{13}$C-NMR.

From the viewpoint of improving the biodegradability, the total degree of acetyl substitution of the cellulose acetate is preferably 2.40 or less, and more preferably 2.20 or less. From the viewpoint of ease of molding, the total degree of acetyl substitution of the cellulose acetate is preferably 1.85 or more, and more preferably 2.00 or more. The total degree of acetyl substitution of the cellulose acetate may be from 1.75 to 2.40, from 1.75 to 2.20, from 1.85 to 2.55, from 1.85 to 2.40, from 1.85 to 2.20, from 2.00 to 2.55, from 2.00 to 2.40, and from 2.0) to 2.20.

The total degree of acetyl substitution in the present disclosure is a sum of respective degrees of acetyl substitution at the 2-, 3-, and 6-positions of the glucose ring of the cellulose acetate as determined by the measurement method described above.

[Viscosity-Average Degree of Polymerization (DPv) of Cellulose Acetate]

The viscosity-average degree of polymerization (DPv) of the cellulose acetate according to the present disclosure is not particularly limited, and is preferably 400 or less, more preferably 300 or less, still more preferably 200 or less from the viewpoint of improving the degradability. From the viewpoint of ease of molding, the viscosity-average degree of polymerization is preferably 10 or more, more preferably 15 or more, and particularly preferably 20 or more. The viscosity-average degree of polymerization (DPv) may be from 10 to 400, from 10 to 300, from 10 to 200, from to 40, from 15 to 300, from 15 to 200, from 20 to 400, from 20 to 300, and from 20 to 200.

The viscosity-average degree of polymerization (DPv) is determined based on the limiting viscosity number ([η], unit: cm³/g) of cellulose acetate.

The limiting viscosity number ([η], unit: cm³/g) is determined in accordance with JIS-K-7367-1 and ISO 1628-1. Specifically, the limiting viscosity number is determined by preparing a sample solution in which dimethyl sulfoxide (DMSO) is used as a solvent, measuring the logarithmic relative viscosity at 25° C. using an Ubbelohde-type viscometer of size number IC, and dividing the logarithmic relative viscosity at 25° C. by the concentration of the sample solution.

Using the obtained limiting viscosity number [η], the viscosity-average molecular weight was calculated by the following equation in accordance with the literature of Kamide et al. (Polymer Journal, 13, 421-431 (1981)).

Viscosity-average molecular weight=(limiting viscosity number [η]/0.171)(1/0.61)

Using the calculated viscosity-average molecular weight, the viscosity-average degree of polymerization (DPv) was determined by the following equation.

Viscosity-average degree of polymerization (*DPv*) =viscosity-average molecular weight/(162.14+ 42.037×*DS*)

In the equation, DS is the total degree of acetyl substitution described above.

[Sulfuric Acid Amount in Cellulose Acetate]

From the viewpoint of improving the biodegradability in seawater, the sulfuric acid amount in the cellulose acetate of the present disclosure is preferably 10 ppm or more, and more preferably 20 ppm or more. From the viewpoint of ease of production, the sulfuric acid amount is preferably 100 ppm or less, more preferably 80 ppm or less, and particularly preferably 50 ppm or less. The sulfuric acid amount is preferably 10 ppm or more and 100 ppm or less, preferably 20 ppm or more and 80 ppm or less, and particularly preferably 20 ppm or more and 50 ppm or less, using 36 ppm as a median value. The sulfuric acid amount in the cellulose acetate may be from 10 to 80 ppm, from 10 to 50 ppm, or from 20 to 100 ppm.

The sulfuric acid amount of the cellulose acetate is measured by the following method. First, dried cellulose acetate is weighed and then burned in an electric furnace at 1300° C., and the produced sulfurous acid gas is trapped in 101% hydrogen peroxide water. The trap liquid is titrated with a normal aqueous sodium hydroxide solution. From the obtained titration value, the sulfuric acid amount in cellulose acetate is obtained as an amount in terms of $H_2SO_4$ per absolute dry cellulose acetate, and the sulfuric acid amount in cellulose acetate is expressed in ppm (weight basis).

Method for Producing Cellulose Acetate

The production method of the cellulose acetate is not particularly limited as long as the cellulose acetate has a total degree of acetyl substitution of 1.75 or more and 2.55 or less, and at least one of the degree of acetyl substitution at 2-position or the degree of acetyl substitution at 3-position is 0.7 or less. The cellulose acetate of the present disclosure may also be obtained by hydrolyzing cellulose acetate having an appropriate degree of substitution and produced by a normal producing method as a starting material.

For example, the cellulose acetate of the present disclosure is obtained by dissolving cellulose acetate in dimethyl sulfoxide (DMSO)/water/α-amine (for example, dimethylene amine or hexamethylene amine) and hydrolyzing the cellulose acetate. The degrees of hydrolysis at 2- and 3-positions differ depending on the type of α-amine used. For example, in the case of hexamethylenediamine ($NH_2(CH_2)_6NH_2$), the acetyl group at the 3-position is preferentially hydrolyzed. In the case of dimethyleneamine ($HN(CH_3)_2$), the acetyl group at the 2-position is preferentially hydrolyzed.

In addition, the 2- and 3-positions are preferentially hydrolyzed by adding a sodium hydroxide/acetone/aqueous solution of about 0.1 N and heating the mixture to 40° C. to 80° C. The temperature for hydrolysis is preferably high, may be 80° C. or higher, and is preferably 100° C. or lower.

In addition, the cellulose acetate of the present disclosure may be obtained by a known method in which acetylation is performed in a state where a known protecting group is bonded to at least one of the carbon atom at 2-position or the carbon atom at 3-position, and then deprotection is performed. Typically, reference is made to the techniques disclosed in the Journal of the Japan Wood Research Society, vol 60, p 144-168 (2014), Biomacromolecules, 13, 2195-2201 (2012). Carbohydrate Polymer, 170, 23 (2017), and the like.

[Cellulose Acetate Composition]

The cellulose acetate composition according to the present disclosure includes the cellulose acetate described above and an additive. The additive is selected from the group consisting of (a) to (c) below:

(a) substances of which a pH of a 1 wt. % aqueous solution at 20° C. is 8 or more, (b) substances that dissolve in water at 20° C. in an amount of 2 wt. % or more, and (c) substances that exhibit biodegradability in seawater.

The substance (a) of which a pH of a 1 wt. % aqueous solution at 20° C. is 8 or more promotes hydrolysis (deacetylation) of cellulose acetate in weakly basic seawater. This is considered to contribute to improvement of the biodegradability of the cellulose acetate composition.

In addition, when the cellulose acetate composition is fed into seawater, the substance (b) that dissolves in water at 20° C. in an amount of 2 wt. % or more is dissolved and eluted from the cellulose acetate composition. The substance (c) that exhibits biodegradability in seawater is gradually eluted from the cellulose acetate composition by biodegradation from the moment when the cellulose acetate composition is fed into seawater. Due to such elution, structural voids are formed in the molded article formed of the cellulose acetate composition, and the substantial surface area of the molded article is increased. It is considered that by increasing the surface area, the hydrolysis (deacetylation) of cellulose acetate in seawater is promoted, and microorganisms easily enter through voids, so that the biodegradability of the cellulose acetate composition is improved.

It is preferable that the action of the additive in the cellulose acetate composition is not exhibited when the cellulose acetate composition is used as a product, and is rapidly exhibited after the cellulose acetate composition is brought into contact with seawater. Therefore, when the additive is a solid, the additive is preferably dispersed in the cellulose acetate composition as particles, the particle size thereof is preferably as small as possible, and the specific surface area thereof is preferably large.

[Content of Cellulose Acetate]

From the viewpoint that high biodegradability is exhibited in seawater, the content of the cellulose acetate of the present disclosure in the cellulose acetate composition is preferably 50 wt. % or more and more preferably 55 wt. % or more with respect to the entire composition. The content of the cellulose acetate is preferably 90 wt. % or less, and more preferably 85 wt. % or less, from the viewpoint of effectively exhibiting a decomposition promoting effect by the additive. The content of the cellulose acetate in the composition of the present disclosure may be from 50 to 90 wt. %, from 50 to 85 wt. %, from 55 to 90 wt. %, and from 55 to 85 wt. %. When two or more types of cellulose acetate with different physical properties are used, the total amount thereof is adjusted to the aforementioned numerical range.

[Added Amount of Additive]

From the viewpoint of improving biodegradability, the total added amount of the additives in the cellulose acetate composition according to the present disclosure is preferably 3 wt. % or more, and more preferably 5 wt. % or more, with respect to the entire composition. From the viewpoint of ease of molding, the total added amount of the additives is preferably 40 wt. % or less and more preferably 35 wt. % or less. The total added amount of the additives in the composition of the present disclosure may be from 3 to 40 wt. %, from 3 to 35 wt. %, from 5 to 40 wt. %, and from 5 to 35 wt. %. When a plurality of additives are used, the total amount thereof is adjusted to the aforementioned numerical range.

[Content of Cellulose Acetate and Additive]

From the viewpoint of obtaining excellent biodegradability, the total content of the cellulose acetate and the additive in the cellulose acetate composition according to the present disclosure is preferably 85 wt. % or more, more preferably 90 wt. % or more, and particularly preferably 95 wt. % or more. The upper limit of the total content is not particularly limited, and may be 100 wt. %.

[Substance (a) of which pH of 1 wt. % Aqueous Solution at 20° C. is 8 or More]

The substance of which a pH of a 1 wt. % aqueous solution at 20° C. is 8 or more can be also referred to as a basic additive. The pH of a 1 wt. % aqueous solution of the basic additive at 20° C. is preferably 8.5 or more and more preferably from 8.5 to 11. The pH of the 1 wt. % aqueous solution is measured in accordance with a known procedure, and for example, is measured with a glass pH electrode.

In the present disclosure, an "aqueous solution" does not only mean a state in which the solute is completely dissolved in water, but also includes a suspension. The "suspension" includes a slurry and a colloidal solution, which are disperse systems with solid particles dispersed in a liquid. In addition, the "1 wt. % aqueous solution" in the present disclosure also includes those aqueous solutions for which, when the basic additive is added in water to a concentration of 1 wt. %, part of the basic additive dissolves and forms an aqueous solution, and the remaining part of the basic additive forms a suspension.

Preferably, the substance (a) of which a pH4 of a 1 wt. % aqueous solution at 20° C. is 8 or more is selected from the group consisting of (a1) to (a3) below:

(a1) inorganic compounds containing an oxygen atom bonded to any metal element of Na, K, Ca, or Mg, (a2) metal salts containing one or more metal ions selected from $Na^+$, $K^+$, $Ca^{2+}$, or $Mg^{2+}$, and one or more anions selected from a carbonate ion, a bicarbonate ion, a silicate ion, or an aluminate ion, and (a3) inorganic compounds containing magnesium.

In particular, in the cellulose acetate composition containing the additives selected from the inorganic compounds (a1) and the metal salts (a2), the seawater biodegradability is remarkably improved. It is considered that this is because the inorganic compounds (a1) and the metal salts (a2) exhibit basicity in seawater, thereby remarkably promoting hydrolysis of the cellulose acetate. From this viewpoint, a composition containing at least one type selected from (a1) and (a2) as an additive is preferable. The cellulose acetate composition of the present disclosure may contain, as other basic substances, basic polymers and oligomers; basic amino acids and proteins; and basic saccharides.

Examples of the inorganic compounds (a1) containing an oxygen atom bonded to any metal element of Na, K, Ca, or Mg include oxides, hydroxides, and composite oxides of any metal element of Na, K, Ca, or Mg. From the viewpoint of improving biodegradability and ease of handling, the inorganic compound (a1) is preferably magnesium oxide, magnesium hydroxide, talc, hydrotalcite, bentonite, calcium oxide, and calcium hydroxide.

Examples of the metal salts (a2) containing one or more metal ions selected from $Na^+$, $K^+$, $Ca^{2+}$, or $Mg^{2+}$, and one or more anions selected from a carbonate ion, a bicarbonate ion, a silicate ion, or an aluminate ion include sodium carbonate, potassium carbonate, calcium carbonate, magnesium carbonate, sodium bicarbonate, potassium bicarbonate, calcium bicarbonate, magnesium bicarbonate, calcium silicate, magnesium silicate, magnesium aluminate, and magnesium aluminometasilicate.

Examples of the sodium aluminate include sodium aluminum dioxide ($NaAlO_2$), which is a double oxide, and sodium tetrahydroxide aluminate ($Na[Al(OH)_4]$), which is a hydroxy complex. The magnesium aluminometasilicate is a substance represented by the general formula $Al_2O_3 \cdot MgO \cdot 2SiO_2 \cdot xH_2O$ (where x represents the number of crystal water and $1 \leq x \leq 10$). As the magnesium aluminometasilicate, for example, magnesium aluminometasilicate of the Japanese Pharmaceutical Codex can be suitably used. Silicic acid is a generic term for compounds of silicon, oxygen, and hydrogen represented by the general formula $[SiO_x(OH)_{4-2x}]_n$.

From the viewpoint of obtaining high biodegradability and excellent moldability, preferable metal salts (a2) are calcium carbonate, magnesium carbonate, calcium silicate, magnesium silicate, magnesium aluminate, and magnesium aluminometasilicate.

Examples of the inorganic compound (a3) containing magnesium include magnesium oxide. The main component of the inorganic compound (a3) containing magnesium is preferably magnesium oxide.

Magnesium oxide is an oxide of magnesium represented by the chemical formula MgO, and is also referred to as magnesia milk. Magnesium oxide may contain a trace amount of each element of Al, Si, P, Mn, Fe, Ni, Cu, and Zn. The trace amount here means less than 1000 ppm and preferably less than 10 Wppm.

In the present disclosure, the method for producing magnesium oxide is not particularly limited. The method may be a method for producing magnesium oxide by calcining and pulverizing a natural magnesium carbonate ore ($MgCO_3$) in dolomite ($CaCO_3.MgCO_3$), or a method for producing magnesium oxide by precipitating magnesium ions in seawater as a hydroxide ($Mg(OH)_2$) and dehydrating the precipitated magnesium hydroxide at a high temperature.

[Substance (b) that Dissolves in Water at 20° C. in Amount of 2 wt. % or More]

The substance (b) that dissolves in water at 20° C. in amount of 2 wt. % or more may be a high molecular weight or low molecular weight material as long as it is water-soluble. Preferably, the substance (b) that dissolves in water at 20° C. in an amount of 2 wt. % or more is selected from the group consisting of (b1) to (b3) below:

(b1) glycerin esters,
(b2) citrates, and
(b3) polyethylene glycols having a number average degree of polymerization of 20 or less.

The glycerin ester (b1), the citrate (b2), and the polyethylene glycol (b3) having a number average degree of polymerization of 20 or less also act as a plasticizer for cellulose acetate. Therefore, the cellulose acetate composition including these additives is easy to melt-mold.

The glycerin ester (b1) is a compound in which at least one hydroxyl group of glycerin is esterified, and is a compound esterified by a carboxylic acid having preferably a molecular weight of 150 or less and more preferably a molecular weight of 130 or less. The glycerin ester (b1) may be one in which all three hydroxyl groups of glycerin are esterified with the same carboxylic acid, one in which two hydroxyl groups are esterified with the same carboxylic acid, or one in which all three hydroxyl groups of glycerin are esterified with different carboxylic acids.

The carboxylic acid may be an aliphatic carboxylic acid (fatty acid) or an aromatic carboxylic acid. From the viewpoint of reducing environmental load, a fatty acid is preferable. The fatty acid may be a saturated fatty acid or an unsaturated fatty acid. Preferably, the glycerin ester (b1) is esterified with a saturated fatty acid. Specific examples of the saturated fatty acid include formic acid, acetic acid, propionic acid, butyric acid, and the like. The more preferable glycerin ester (b1) is glycerin acetate having a degree of acetyl substitution of 0 or more and 3 or less, and triacetin (glycerol trisacetate) in which all three hydroxyl groups of glycerin are esterified (in other words, acetylated) with acetic acid is particularly preferable.

Triacetin is a component recognized to be safe for human intake and is easily biodegraded, and thus has a small environmental load. In addition, the cellulose acetate composition formed by adding triacetin to the cellulose acetate has improved biodegradability over the cellulose acetate used alone. Furthermore, the addition of triacetin to the cellulose acetate can efficiently lower the glass transition temperature of the cellulose acetate. Thus, this can impart excellent thermoformability to the raw material.

The citrate (b2) is a compound in which at least one carboxyl group of citric acid is esterified. The citrate (b2) may be one in which all three carboxyl groups of citric acid are esterified with the same hydrocarbon group, one in which two carboxyl groups are esterified with the same hydrocarbon group, or one in which all three carboxyl groups of glycerin are esterified with different hydrocarbon groups.

The hydrocarbon group may be linear, branched, or cyclic. An aliphatic hydrocarbon group is preferable, and a saturated aliphatic hydrocarbon group (alkyl group) is more preferable. Examples of the alkyl group include a methyl group, an ethyl group, and a propyl group. Examples of the preferable citrate (b2) include triethyl citrate and acetyl triethyl citrate.

The polyethylene glycol (b3) having a number average degree of polymerization of 20 or less has an ethylene oxy group as the repeating unit. The degree of polymerization is the number of repeating units. The polyethylene glycol (b) having a number average degree of polymerization of 20 or less is easily dissolved in seawater, and can contribute to improving the biodegradability. From this viewpoint, the number average degree of polymerization of the polyethylene glycol is more preferably 18 or less, and particularly preferably 15 or less. The number average degree of polymerization of the polyethylene glycol is preferably 2 or more, and more preferably 3 or more, from the viewpoint of suppressing bleed-out in the case of a molded article. The number average degree of polymerization is calculated from the number average molecular weight measured by size exclusion chromatography (GPC) using polystyrene as a standard substance.

[Substance (c) that Exhibits Biodegradability in Seawater]

Examples of the substance (c) that exhibits biodegradability in seawater include materials that undergoes degradation by not less than 50 wt. %, preferably not less than 70 wt. %, and even more preferably not less than 90 wt. % relative to the cellulose for comparison, after a duration of 120 days by a method specified in ASTM D6691.

Examples of the substance (c) that exhibits biodegradability in seawater include polyester having a weight average molecular weight of 50,000 or less. Preference is given to polyester selected from the group consisting of polyhydroxybutyrate, poly(3-hydroxybutyrate-co-3-hydroxyhexanoate, polybutylene succinate, polycaprolactone, and polyglycolic acid.

[Combinations of Preferable Additives]

From the viewpoint of improving biodegradability, the cellulose acetate composition of the present disclosure preferably includes an additive selected from magnesium oxide, magnesium aluminometasilicate, and triacetin. From the viewpoint of improving biodegradability and ease of molding, the cellulose acetate composition of the present disclosure preferably includes at least one selected from magnesium oxide and magnesium aluminometasilicate, and triacetin. An additive including a combination of magnesium oxide and triacetin is more preferable.

[Method for Producing Cellulose Acetate Composition]

The cellulose acetate composition of the present disclosure is obtained by mixing cellulose acetate having a total degree of acetyl substitution of 1.75 or more and 2.55 or less, in which at least one of the degree of acetyl substitution at 2-position or the degree of acetyl substitution at 3-position is 0.7 or less, and the above-described additive in a solvent such as acetone, and then removing the solvent. The cellulose acetate composition of the present disclosure may be obtained by melt-kneading. Preferably, the composition is obtained by mixing the cellulose acetate and the additive, and then melt-kneading. By mixing before melt-kneading, the additive and the cellulose acetate are more uniformly mixed with each other in a short time to homogenize the resulting kneaded product, so that a composition with improved melt fluidity and processing accuracy is obtained.

A known mixer such as a Henschel mixer can be used for mixing the cellulose acetate and the additive. Dry mixing or wet mixing may be used. In using a mixer such as a Henschel mixer, the temperature in the mixer is preferably a temperature at which the cellulose acetate does not melt, for example, in a range of not lower than 20° C. and lower than 200° C.

An extruder such as a twin-screw extruder can be used for melt-kneading the cellulose acetate and the additive or melt-kneading after mixing the cellulose acetate and the additive. From the viewpoint of uniformity of the kneaded product and suppression of degradation due to heating, the kneading temperature (cylinder temperature) of the extruder is preferably 170° C. or higher and 230° C. or lower. For example, when melt-kneading is performed using a twin-screw extruder, the kneading temperature (also referred to as cylinder temperature) may be 200° C. The kneaded product may be extruded into a strand shape from a die attached to the tip of the twin-screw extruder and then hot-cut into pellets. Here, the die temperature may be approximately 220° C.

The added amount of the additive to the entire cellulose acetate composition obtained is preferably 3 wt. % or more and 40 wt. % or less. When two or more kinds of additives are blended, the total amount thereof is adjusted to 3 wt. % or more and 40 wt. % or less.

The blending amount of the cellulose acetate with respect to the entire cellulose acetate composition obtained is preferably 50 wt. % or more, and more preferably 50 wt. % or more and 90 wt. % or less. When two or more kinds of cellulose acetate are blended, the total amount thereof is adjusted to preferably 50 wt. % or more, and more preferably 50 wt. % or more and 90 wt. % or less.

In the range that does not inhibit the biodegradability of the cellulose acetate composition, other additives that are different from the additives described above may be blended in this composition. Examples of other additives include colorants, ultraviolet absorbers, light stabilizers, antioxidants, thermal stabilizers, optical characteristic modifiers, fluorescent brighteners, and flame retardants. In this case, the total content of the cellulose acetate and the additive in the cellulose acetate composition is preferably 85 wt. % or more.

The cellulose acetate of the present disclosure has excellent melt moldability and is thus suitable for melt molding. The form of the molded article formed by molding the cellulose acetate composition of the present disclosure is not particularly limited, and examples include a one-dimensional molded article, such as fibers; a two-dimensional molded article, such as films; and a three-dimensional molded article, such as particles including pellets, tubes, and hollow cylindrical shapes.

The cellulose acetate or the cellulose acetate composition of the present disclosure has excellent biodegradability in seawater and is thus suitable for products often disposed, including straws, containers such as cups, packaging materials, binders, and tobacco filters; fibers for clothing; non-woven fabrics; products at least partially flowing with water into the environment during use, such as cosmetic beads and scrubs; and products expected to be flushed into a toilet, such as hygiene materials (diapers and sanitary products).

EXAMPLES

Hereinafter, effects of the present disclosure will be appreciated by examples. Note that each of the configurations, combinations thereof, and the like in each of the embodiments are an example, and various additions, omissions, substitutions, and other changes may be made as appropriate without departing from the spirit of the present disclosure. The present disclosure is not limited by the embodiments and is limited only by the claims. Unless otherwise specified, all test temperatures are room temperature (20° C.±5° C.).

Example 1

Cellulose acetate of Example 1 was synthesized with reference to the Journal of the Japan Wood Research Society, vol 60, p 144-168 (2014), and Biomacromolecules, 13, 2195-2201 (2012).

First, 100.4 g of cellulose (linter raw material) was added to 3 L of an aqueous NaOH solution having a concentration of 18 wt. %, and the mixture was stirred at room temperature for 1 hour. Thereafter, the cellulose was collected by filtration and washed with water until the washing solution became neutral. Next, this cellulose was added to 500 ml of dimethylacetamide, and the mixture was stirred at room temperature for 12 hours. Thereafter, the cellulose removed by filtration was washed twice with 500 mL of dimethylacetamide.

Subsequently, this cellulose was added to 4 L of dimethylacetamide, heated at 150° C. for 1 hour, and then cooled until the liquid temperature reached 100° C. Thereafter, 350 g of anhydrous lithium chloride was added, and the mixture was stirred at 100° C. for 1 hour and cooled to 25° C. to dissolve the cellulose in a lithium chloride/dimethylacetamide (DMAC)-based solvent.

To the obtained cellulose solution, 200 g of imidazole and 450 g of thexyldimethyl silyl chloride (1,1,2-trimethylpropyl dimethyl silyl chloride) were added and reacted, and cellulose in which the 2- and 6-positions are silyl etherified was obtained. This crude product was washed with 1.5 L of methanol three times, and 268.0 g of 2,6 silyl etherified cellulose was obtained.

265.5 g of the obtained 2,6 silyl etherified cellulose was dissolved in 2,000 g of dimethylacetamide and 165.9 g of pyridine and then reacted with 142.2 g of allyl chloride. The obtained reaction solution was added to methanol to precipitate, the precipitate (crude product) was washed three times with 1.0 L of methanol, and 265.5 g of a product was obtained. This product was dissolved in 4,000 g of dimethylacetamide and reacted with 380 g of tetrabutylammonium fluoride, and 77.7 g of cellulose in which the 3-position is allyl etherified was obtained.

77.7 g of the obtained 3 allyl cellulose was dissolved in 800 g of dimethylacetamide, 167 g of acetic anhydride and 136 g of pyridine were added thereto and reacted, and 2,6-acetyl-3 allyl cellulose was obtained. Thereafter, 4.9 g of tetrakis(tri-phenylphosphine)palladium was further added to isomerize an allyl ether group, and the resulting mixture was reacted with $K_2CO$ to deprotect the allyl group, thereby obtaining 73.2 g of cellulose acetate of Example 1 in which the 2- and 6-positions were selectively substituted. The free hydroxyl groups of cellulose acetate were propionylated by the method described above, and the degree of substitution at the 2-, 3-, and 6-positions was determined by measuring a $^{13}C$-NMR spectrum in deuterated chloroform. The results obtained are shown in Table 1 below as DS2, DS3, and DS6, respectively. The total degree of acetyl substitution is the sum of the degrees of acetyl substitution at the 2-, 3-, and 6-positions. The cellulose acetate of Example 1 had a DS2 of 0.98, a DS3 of 0.47, and a DS6 of 1.00, and the total degree of acetyl substitution was 2.45.

After 10 parts by weight of the cellulose acetate obtained in Example 1 was heated at 110° C. for 2 hours and dried, the cellulose acetate was charged into 90 parts by weight of acetone, stirred at 25° C. for 6 hours, and dissolved, thereby preparing a dope for film production. This dope was allowed to flow on a glass plate, casted with a bar coater, and dried at 40° C. for 30 minutes. Then, the film was peeled off from the glass plate, dried at 80° C. for another 30 minutes, thereby obtaining a cellulose acetate film (thickness of 30 μm) of Example 1.

Example 2

Cellulose acetate of Example 2 was synthesized with reference to JP 2015-224256 A.

First, 50 g of cellulose acetate (degree of acetyl substitution: 2.87) was dissolved in 500 g of N-methylpyrrolidone. Next, 57 g of cesium carbonate was added and stirred at room temperature for 10 hours to be reacted. The resulting reaction solution was precipitated by addition of an appropriate amount of water, and the precipitate was washed with methanol and dried, and 37.8 g of cellulose acetate in Example 2 was obtained. The degrees of substitution at the 2-, 3-, and 6-positions were determined by measuring $^1$H-NMR spectrum in the same manner as in Example 1. The obtained results are shown in Table 1 below. The cellulose acetate of Example 2 had a DS2 of 0.65, a DS3 of 0.75, and a DS6 of 0.83, and the total degree of acetyl substitution was 2.23.

Using the obtained cellulose acetate, a cellulose acetate film (thickness: 30 μm) of Example 2 was obtained in the same manner as in Example 1.

Example 3

First, 4.5 g of cellulose from a linter pulp was dissolved in 75 g of 1-butyl-3-methylimidazolium chloride. Next, acetic anhydride was added in an amount of 4.9 mol times (13.8 g) with respect to a cellulose skeleton, and the mixture was reacted at 80° C. for 1 hour. Thereafter, the resulting reaction solution was precipitated by addition of an appropriate amount of methanol, and the precipitate was washed with methanol and dried, and 5.44 g of cellulose acetate in Example 3 was obtained. The degrees of substitution at the 2-, 3-, and 6-positions were determined by measuring $^1$H-NMR spectrum in the same manner as in Example 1. The obtained results are shown in Table 1 below. The cellulose acetate of Example 3 had a DS2 of 0.49, a DS3 of 0.66, and a DS6 of 0.95, and the total degree of acetyl substitution was 2.10.

Using the obtained cellulose acetate, a cellulose acetate film (thickness: 30 μm) of Example 3 was obtained in the same manner as in Example 1.

Example 4

Cellulose acetate of Example 1 was synthesized with reference to the Journal of the Japan Wood Research Society, vol 60, p 144-168 (2014), and Biomacromolecules, 13, 2195-2201 (2012).

First, 100.4 g of cellulose as previously described in Examples 1 to 3 was added to 3 L of an aqueous NaOH solution having a concentration of 18 wt. %, and the mixture was stirred at room temperature for 1 hour. Thereafter, the solid content (alkali cellulose) was collected by filtration and washed with water until the washing solution became neutral. Next, this cellulose was added to 500 mi of dimethylacetamide, and the mixture was stirred at room temperature for 12 hours. Thereafter, the cellulose removed by filtration was washed twice with 500 mL of dimethylacetamide.

Subsequently, this cellulose was added to 4 L of dimethylacetamide, heated at 150° C. for 1 hour, and then cooled until the liquid temperature reached 100° C. Thereafter, 350 g of anhydrous lithium chloride was added, and the mixture was stirred at 100° C. for 1 hour and cooled to 25° C. to dissolve the cellulose in a lithium chloride/dimethylacetamide (DMAC)-based solvent.

To the obtained cellulose solution, 200 g of imidazole and 237.2 g of thexyldimethyl silyl chloride (1,1,2-trimethylpropyl dimethyl silyl chloride) were added and reacted, and cellulose in which the 2- and 6-positions are silyl etherified was obtained. This crude product was washed with 1.5 L of methanol three times, and 168.0 g of 2,6 silyl etherified cellulose was obtained.

The total amount of the obtained 2,6 silyl etherified cellulose was dissolved in 800 g of dimethylacetamide, and 387.6 g of acetic anhydride and 316. g of pyridine were added and reacted to acetylate the remaining hydroxyl groups. 1.5 L of methanol was added to the obtained reaction solution, thereby obtaining a precipitate. This precipitate was collected by filtration and then washed 3 times with 500 mL of methanol, and 203 g of a product was obtained.

The obtained product was dissolved in 4 L of dimethyl sulfoxide, and reacted with 469 g of tetrabutylammonium fluoride to deprotect a silyl ether group, thereby obtaining 82.4 g of cellulose acetate of Example 4. The degrees of substitution at the 2-, 3-, and 6-positions were determined by measuring $^1$H-NMR spectrum in the same manner as in Example 1. The obtained results are shown in Table 1 below. The cellulose acetate of Example 4 had a DS2 of 0.42, a DS3 of 1.00, and a DS6 of 0.46, and the total degree of acetyl substitution was 1.88.

Using the obtained cellulose acetate, a cellulose acetate film (thickness: 30 μm) of Example 4 was obtained in the same manner as in Example 1.

Comparative Example 1

A hardwood prehydrolysis kraft pulp with an α-cellulose content of 98.4 wt. % was ground with a disc refiner into a cotton-like form. Onto 100 parts by weight of the ground pulp (water content percentage of 8%), 26.8 parts by weight of acetic acid was sprayed. The mixture was thoroughly stirred and then pretreated by allowing the mixture to stand for 60 hours to be activated. The activated pulp was added to a mixture of 323 parts by weight of acetic acid, 245 parts by weight of acetic anhydride, and 13.1 parts by weight of sulfuric acid. The temperature was adjusted from 5° C. to a maximum temperature of 40° C. over 40 minutes, and the pulp was acetylated for 90 minutes. A neutralizing agent (24% aqueous solution of magnesium acetate) was added over 3 minutes, and thus the sulfuric acid amount (sulfuric acid amount for aging) was adjusted to 2.5 parts by weight. Furthermore, the temperature of the reaction bath was raised to 75° C., then water was added, and the water content in the reaction bath (water content for aging) was adjusted to a concentration of 52 mol %. The water concentration for aging was expressed in mol % by multiplying the proportion expressed in molar ratio of the water content in the reaction bath to acetic acid by 100. Then, aging was performed at 85° C. for 100 minutes, magnesium acetate was added to neutralize sulfuric acid to terminate the aging, and a reaction mixture containing cellulose acetate was obtained. A dilute aqueous solution of acetic acid was added to the resulting reaction mixture. The cellulose acetate was separated, then washed, dried, and stabilized with calcium hydroxide, and the cellulose acetate of Comparative Example 1 was obtained.

The degrees of substitution at the 2-, 3-, and 6-positions were determined by measuring $^{13}$C-NMR spectrum in the same manner as in Example 1. The obtained results are shown in Table 1 below. The cellulose acetate of Comparative Example 1 had a DS2 of 0.86, a DS3 of 0.85, and a DS6 of 0.75, and the total degree of acetyl substitution was 2.46.

Using the obtained cellulose acetate, a cellulose acetate film (thickness: 30 μm) of Comparative Example 1 was obtained in the same manner as in Example 1.

Examples 5, 10, 15, and 20

After 9.5 parts by weight of the cellulose acetate in each of Examples 1 to 4 was heated at 110° C. for 2 hours and dried, the cellulose acetate was charged into 90 parts by weight of acetone, stirred at 25° C. for 6 hours, and dissolved. To this mixed solution, 0.5 parts by weight of a powder of magnesium aluminometasilicate was added as an additive. The mixture was further stirred at 25° C. for 6 hours, and a dope for film production was prepared. This dope was allowed to flow on a glass plate and casted with a bar coater, and dried at 40° C. for 30 minutes. Then, the film was peeled off from the glass plate, dried at 80° C. for another 30 minutes, and cellulose acetate composition films (thickness of 30 μm) of Examples 5, 10, 15, and 20 were obtained.

Examples 6, 11, 16, and 21

Cellulose acetate composition films (thickness: 30 μm) of Examples 6, 11, 16, and 21 were obtained in the same manner as in Examples 5, 10, 15, and 20 except that magnesium oxide was used as an additive, and the additive was added in an amount of 0.4 parts by weight with respect to 9.6 parts by weight of each cellulose acetate.

Examples 7, 12, 17, and 221

Cellulose acetate composition films (thickness: 30 μm) of Examples 7, 12, 17, and 22 were obtained in the same manner as in Examples 5, 10, 15, and 20 except that triacetin was used as an additive, and the additive was added in an amount of 2.0 pans by weight with respect to 8.0 parts by weight of each cellulose acetate.

Examples 8, 13, 18, and 23

Cellulose acetate composition films (thickness 30 μm) of Examples 8, 13, 18, and 23 were obtained in the same manner as in Examples 5, 10, 15, and 20 except that magnesium aluminometasilicate and triacetin were used as additives, and 0.5 parts by weight of magnesium aluminometasilicate and 2.0 parts by weight of triacetin were added with respect to 7.5 parts by weight of each cellulose acetate.

Examples 9, 14, 19, and 24

Cellulose acetate composition films (thickness 30 μm) of Examples 9, 14, 19, and 24 were obtained in the same manner as in Examples 5, 10, 15, and 20 except that magnesium oxide and triacetin were used as additives, and 0.4 parts by weight of magnesium oxide and 2.0 parts by weight of triacetin were added with respect to 7.6 parts by weight of each cellulose acetate.

[Evaluation of Degree of Seawater Biodegradation]

According to the following procedure, each of the cellulose acetate films of Examples 1 to 4 and Comparative Example 1 and the cellulose acetate composition films of Examples 5 to 24 were pulverized to an average particle size of about 20 μm, and then subjected to the following biodegradation test.

60 mg of each sample was charged into 250 g of seawater, and stirred at a temperature of 30° C. The amount of carbon dioxide generated was measured 90 days and 120 days after the sample was charged. The theoretical carbon dioxide generation amount was calculated from the total organic carbon amount (TOC) measured for each sample subjected to the test, and the ratio of the value obtained by subtracting the measured value of the blank (seawater only) from the measured value to the theoretical carbon dioxide generation amount was taken as the degree of biodegradation (%).

The obtained results are shown in Tables 1 and 2 below.

TABLE 1

| | Total degree of acetyl substitution | DS2 | DS3 | DS6 | Biodegradability Degree of biodegradation [wt. %] | | |
|---|---|---|---|---|---|---|---|
| | | | | | 0 days | 90 days | 120 days |
| Example 1 | 2.45 | 0.98 | 0.47 | 1.00 | 0 | 34.4 | 62.0 |
| Example 2 | 2.23 | 0.65 | 0.75 | 0.83 | 0 | 49.1 | 76.0 |
| Example 3 | 2.10 | 0.49 | 0.66 | 0.95 | 0 | 53.3 | 83.5 |
| Example 4 | 1.88 | 0.42 | 1.00 | 0.46 | 0 | 75.7 | 91.5 |
| Comperative Example 1 | 2.46 | 0.86 | 0.85 | 0.75 | 0 | 26.3 | 54.0 |

TABLE 2

| | Total degree of acetyl substitution | DS2 | DS3 | DS6 | Additive Type | Content (wt. %) | Biodegradability Degree of biodegradation [wt. %] | | |
|---|---|---|---|---|---|---|---|---|---|
| | | | | | | | 0 days | 90 days | 120 days |
| Example 5 | 2.45 | 0.98 | 0.47 | 1.00 | Mg aluminometasilicate | 5 | 0 | 44.6 | 72.9 |
| Example 6 | 2.45 | 0.98 | 0.47 | 1.00 | MgO | 4 | 0 | 44.0 | 72.3 |
| Example 7 | 2.45 | 0.98 | 0.47 | 1.00 | Triacetin | 20 | 0 | 54.4 | 82.3 |
| Example 8 | 2.45 | 0.98 | 0.47 | 1.00 | Mg aluminometasilicate Triacetin | 5 20 | 0 | 63.7 | 92.7 |
| Example 9 | 2.45 | 0.98 | 0.47 | 1.00 | MgO Triacetin | 4 20 | 0 | 63.5 | 92.1 |
| Example 10 | 2.23 | 0.65 | 0.75 | 0.83 | Mg aluminometasilicate | 5 | 0 | 66.4 | 94.1 |
| Example 11 | 2.23 | 0.65 | 0.75 | 0.83 | MgO | 4 | 0 | 66.2 | 93.6 |
| Example 12 | 2.23 | 0.65 | 0.75 | 0.83 | Triacetin | 20 | 0 | 71.0 | 97.0 |
| Example 13 | 2.23 | 0.65 | 0.75 | 0.83 | Mg aluminometasilicate Triacetin | 5 20 | 0 | 86.0 | 96.0 |
| Example 14 | 2.23 | 0.65 | 0.75 | 0.83 | MgO Triacetin | 4 20 | 0 | 86.3 | 96.2 |
| Example 15 | 2.10 | 0.49 | 0.66 | 0.95 | Mg aluminometasilicate | 5 | 0 | 69.3 | 97.4 |
| Example 16 | 2.10 | 0.49 | 0.66 | 0.95 | MgO | 4 | 0 | 69.0 | 98.0 |
| Example 17 | 2.10 | 0.49 | 0.66 | 0.95 | Triacetin | 20 | 0 | 73.3 | 98.4 |
| Example 18 | 2.10 | 0.49 | 0.66 | 0.95 | Mg aluminometasilicate Triacetin | 5 20 | 0 | 89.3 | 96.8 |
| Example 19 | 2.10 | 0.49 | 0.66 | 0.95 | MgO Triacetin | 4 20 | 0 | 88.8 | 98.8 |
| Example 20 | 1.88 | 0.42 | 1.00 | 0.46 | Mg aluminometasilicate | 5 | 0 | 98.8 | 99.0 |
| Example 21 | 1.88 | 0.42 | 1.00 | 0.46 | MgO | 4 | 0 | 98.3 | 98.9 |
| Example 22 | 1.88 | 0.42 | 1.00 | 0.46 | Triacetin | 20 | 0 | 96.1 | 98.7 |
| Example 23 | 1.88 | 0.42 | 1.00 | 0.46 | Mg aluminometasilicate Triacetin | 5 20 | 0 | 96.3 | 97.7 |
| Example 24 | 1.88 | 0.42 | 1.00 | 0.46 | MgO Triacetin | 4 20 | 0 | 97.4 | 97.8 |

As shown in Tables 1 and 2, the cellulose acetates of Examples have a higher decomposition rate in seawater than that of cellulose acetates of Comparative Examples. In addition, the cellulose acetate compositions of Examples contained additives, thereby improving the decomposition rate in seawater as compared with the corresponding cellulose acetates. From this evaluation result, the superiority of the present disclosure is clear.

INDUSTRIAL APPLICABILITY

The cellulose acetate and the composition described above are not limited to the film shape, and can be applied as biodegradable molded articles in various shapes.

The invention claimed is:

1. A cellulose acetate composition comprising:
cellulose acetate having a total degree of acetyl substitution of 1.75 or more and 2.55 or less, wherein a degree of acetyl substitution at 2-position or a degree of acetyl substitution at 3-position is 0.7 or less and 0.42 or more; and
an additive,
wherein the additive comprises at least one selected from the group consisting of (a) substances of which a pH of a 1 wt. % aqueous solution at 20° C. is 8 or more, (b) substances that dissolve in water at 20° C. in an amount of 2 wt. % or more, and (c) substances that exhibit biodegradability in seawater.

2. The cellulose acetate composition according to claim 1, wherein a content of the cellulose acetate is 50 wt. % or more of the cellulose acetate composition.

3. The cellulose acetate composition according to claim 1, wherein a total content of the additive is 3 wt. % or more and 40 wt. % or less of the cellulose acetate composition.

4. The cellulose acetate composition according to claim 1,
wherein the additive comprises at least one selected from
(a) substances of which a pH of a 1 wt. % aqueous solution at 20° C. is 8 or more, which are selected from the group consisting of
(a1) inorganic compounds containing an oxygen atom bonded to any metal element of Na, K, Ca, or Mg,
(a2) metal salts containing one or more metal ions selected from Na$^+$, K$^+$, Ca$^{2+}$, or Mg$^{2+}$, and one or more anions selected from a carbonate ion, a bicarbonate ion, a silicate ion, or an aluminate ion, and
(a3) inorganic compounds containing magnesium.

5. The cellulose acetate composition according to claim 4, wherein the additive comprises at least one selected from (a3) inorganic compounds containing magnesium, which comprise magnesium oxide as an main component.

6. The cellulose acetate composition according to claim 1,
wherein the additive comprises at least one selected from
(b) substances that dissolve in water at 20° C. in an amount of 2 wt. % or more, which are selected from the group consisting of (b1) glycerin esters,
(b2) citrates, and
(b3) polyethylene glycols having a number average degree of polymerization of 20 or less.

7. The cellulose acetate composition according to claim 1, wherein the additive comprises at least one selected from (c) substances that exhibit biodegradability in seawater, which are polyesters having a weight average molecular weight of 50,000 or less.

8. The cellulose acetate composition according to claim 1, wherein the additive comprises a combination of magnesium oxide and triacetin.

9. The cellulose acetate composition according to claim 1, wherein the degree of acetyl substitution at 2-position and the degree of acetyl substitution at 3-position of the cellulose acetate each are 0.7 or less.

10. The cellulose acetate composition according to claim 1, wherein the total degree of acetyl substitution of the cellulose acetate is 2.00 or more.

11. The cellulose acetate composition according to claim 1, wherein the total degree of acetyl substitution of the cellulose acetate is 2.20 or less.

12. The cellulose acetate composition according to claim 1, wherein a degree of acetyl substitution at 6-position is 0.83 or more and 1.00 or less.

13. The cellulose acetate composition according to claim 1, wherein a degree of acetyl substitution at 6-position is 0.83 or more and 1.00 or less and the total degree of acetyl substitution of the cellulose acetate is 2.00 or more and 2.55 or less.

14. A cellulose acetate composition comprising:
cellulose acetate having a total degree of acetyl substitution of 1.75 or more and 2.55 or less, wherein a degree of acetyl substitution at 2-position or a degree of acetyl substitution at 3-position is 0.7 or less, and a degree of acetyl substitution at 6-position is 0.83 or more; and
an additive,
wherein the additive comprises at least one selected from the group consisting of (a) substances of which a pH of a 1 wt. % aqueous solution at 20° C. is 8 or more, (b) substances that dissolve in water at 20° C. in an amount of 2 wt. % or more, and (c) substances that exhibit biodegradability in seawater.

15. The cellulose acetate composition according to claim 14, wherein the total degree of acetyl substitution of the cellulose acetate is 2.00 or more and 2.55 or less.

16. The cellulose acetate composition according to claim 14, wherein a content of the cellulose acetate is 50 wt. % or more of the cellulose acetate composition.

17. The cellulose acetate composition according to claim 14, wherein a total content of the additive is 3 wt. % or more and 40 wt. % or less of the cellulose acetate composition.

18. The cellulose acetate composition according to claim 14,
wherein the additive comprises at least one selected from
(a) substances of which a pH of a 1 wt. % aqueous solution at 20° C. is 8 or more, which are selected from the group consisting of
(a1) inorganic compounds containing an oxygen atom bonded to any metal element of Na, K, Ca, or Mg,
(a2) metal salts containing one or more metal ions selected from $Na^+$, $K^+$, $Ca^{2+}$, or $Mg^{2+}$, and one or more anions selected from a carbonate ion, a bicarbonate ion, a silicate ion, or an aluminate ion, and
(a3) inorganic compounds containing magnesium.

19. The cellulose acetate composition according to claim 18, wherein the additive comprises at least one selected from (a3) inorganic compounds containing magnesium, which comprise magnesium oxide as an main component.

20. The cellulose acetate composition according to claim 14,
wherein the additive comprises at least one selected from
(b) substances that dissolve in water at 20° C. in an amount of 2 wt. % or more, which are selected from the group consisting of
(b1) glycerin esters,
(b2) citrates, and
(b3) polyethylene glycols having a number average degree of polymerization of 20 or less.

* * * * *